March 2, 1965 A. B. MALINOWSKI 3,172,061

LOW LEVEL MAGNETIC MODULATOR

Filed Aug. 24, 1961 2 Sheets-Sheet 1

INVENTOR.
ANDREW B. MALINOWSKI

BY W. O. Duesenberry
O. E. Hodges

ATTYS.

March 2, 1965 A. B. MALINOWSKI 3,172,061

LOW LEVEL MAGNETIC MODULATOR

Filed Aug. 24, 1961 2 Sheets-Sheet 2

INVENTOR.
ANDREW B. MALINOWSKI
BY W. O. Quesenberry
D. E. Hodges
ATTYS.

United States Patent Office 3,172,061
Patented Mar. 2, 1965

3,172,061
LOW LEVEL MAGNETIC MODULATOR

Andrew B. Malinowski, Washington, D.C., assignor to the United States of America as represented by the Secretary of the Navy Filed Aug. 24, 1961, Ser. No. 133,747
9 Claims. (Cl. 332—12)
(Granted under Title 35, U.S. Code (1952), sec. 266)

The invention described herein may be manufactured and used by or for the Government of the United States of America for governmental purposes without the payment of any royalties thereon or therefor.

This invention relates to modulators, and more particularly to a magnetic modulator for low frequency, low level signals. In certain electronic fields, especially in those concerned with measurement of slowly varying environmental conditions by transducers of one type or another, informational data is obtained in the form of very low frequency signals at very low levels of power. It is desirable in these fields to be able to convert signals at a power level of milli-microwatts and frequency ranges from D.C. to 0.5 cycle per second into a form which is transmittable by conventional radio wave techniques. Where the measuring device and its associated transmission circuitry are inaccessible during operation and depend on storage power supplies, a further advantage may be secured by holding the power consumption of the circuitry to a very low level to preserve the life of the power supply.

In the past, one of the problems associated with the amplification of very low level signals was the minimization of balance or zero drift of the output. In the case of even harmonic modulators, the unbalance in the output could be referred to the input as the signal current necessary to reduce the output to zero. Even by use of equivalent balancing currents obtained by conventional negative feedback methods, this problem could not be avoided since the unbalance had the nature of a spurious signal in the output. The degree to which the output was free of this zero drift depended largely on how well the pair of saturable reactors used in the amplifier were matched. Matching of saturable reactors, however, is a very difficult and dubious process since it is not certain which parameters of the saturable reactors need to be matched and to what degree. Also, the extent of matching could not be maintained over the expected operating life of the device, which could be operating under a wide variety of environmental conditions during the time.

An object of the invention is to provide a modulator for the conversion of very low power level signals of low frequency into a form which is readily transmittable by conventional radio wave techniques, while holding the power consumption of the modulator to a very low level.

Another object of this invention is to provide a square wave oscillator which produces both positive and negative pulses which are symmetrical and have very short rise times for use with the aforesaid modulator.

Various other objects and advantages will be apparent from the following description of one embodiment of the invention, and the novel features will be particularly pointed out hereinafter in connection with the appended claims.

In the accompanying drawings.

Figure 1:
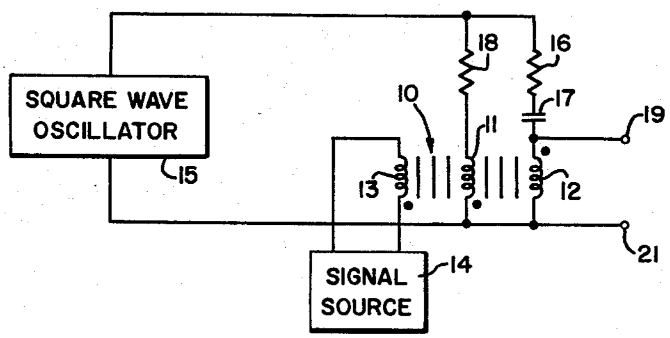
FIG. 1 is a circuit diagram of the essential features of a magnetic modulator according to the invention.

In the embodiment of the invention illustrated in FIG. 1, a magnetic core 10 having a substantially rectangular hysteresis loop characteristic has three windings wound thereon. The first winding 11 is wound in a first direction on the core, as illustrated by the conventional dot symbol, to bias the core into a desired region of operation. The second winding 12 serves as the gate and output winding and is wound on the core in a direction opposite that of the bias winding 11. The third winding 13 serves as the signal winding being connected to a signal source 14 and is wound around the core in the desired direction, in this case, in the same direction as the bias winding 11. A square wave oscillator 15 is connected to supply square wave voltage pulses to both the circuit of the bias winding 11 and the circuit of the gate and output winding 12. Connected in series with the gate winding 12 are a current limiting resistor 16 and a capacitor 17, which complete the gate winding circuit. A current limiting resistor 18 is also connected in series with the bias winding 11 to make up the bias winding circuit. Both of these circuits are connected in parallel to the square wave oscillator 15. The output of the modulator across the output terminals 19 and 21 therefor is taken as the voltage appearing across the gate winding 12.

Figure 2:
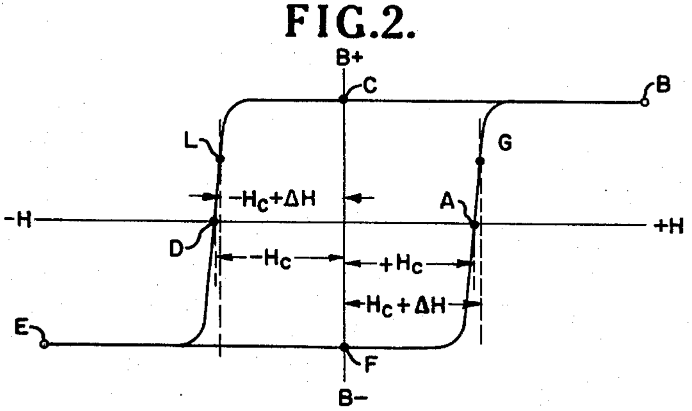
FIG. 2 is a graphical illustration of the hysteresis loop of the magnetic core of the modulator.

The operation of the modulator is best described by reference to FIG. 2, which shows the well-known hysteresis diagram for a square loop hysteresis core material such as might be used in the practice of this invention. First, it will be assumed that the core is originally in the state indicated by point A on the hysteresis curve, that is, a point intermediate the two states of saturation at which no flux exists in the core. This is the condition established by the bias winding when the signal source 14 applies no signal to the signal winding 13. At this point, a positive pulse is applied by the square wave oscillator 15, both to the bias circuit and to the gate circuit. A large pulse of current flows through the gate winding 12 to drive the magnetic core 10 from point A quickly into saturation state, as indicated at point B of FIG. 2. This current continues to flow through the winding 12 until such time as the capacitor 17 becomes fully charged thus stopping the flow of current in this circuit. The limiting resistor 16 prevents the current in this circuit from becoming larger than necessary for effective saturation of the core, thus preventing any unnecessary waste of power. During the time that a current has been flowing through the winding 12, a current has also been flowing through the oppositely wound bias winding 11; however, the flux from this winding has been masked by the greater flux saturating the core. As the saturating flux ceases, the flux in the core returns along the path B, C, D to the state intermediate the two saturated states, as indicated at point D therefor. The limiting resistance 18 is chosen to have a value which will result in an amplitude of current flow through the winding 11 which will generate the exact field strength ($-H_C$) necessary to return the flux density of the core to the point D. The movement of the core flux density along the hysteresis loop path A, B, C, D occurs during the first portion of the positive square wave pulse; the core will then remain at the point D state due to the action of the bias winding until a negative pulse is applied by the square oscillator 15 at which time the flux will traverse the path D, E, F, A on the bottom half of the hysteresis loop, as illustrated.

It is helpful to an understanding of the invention to consider some of the theory involved in the operation of the modulator. As the voltage from the square wave 15 oscillator switches from a negative to a positive pulse, a certain amount of time is required thereafter to move from the unsaturated starting point A to the point B in saturation; this time may be determined from Faraday's law, which states that the voltage across a pure inductor is equal to the rate of change of flux threading the turns, times the number of turns. Making the approximation that the flux density is constant across the cross section of the core, the following relationship can be written;

$$\int_0^{T_s} e.dt = N_G A_C \int_0^{B_m} dB \qquad (1)$$

$e = E_R$=constant
$T_S$=pulse length in seconds
$N_G$=number of turns of the gate winding on the core
$A_C$=cross-sectional area of the core
$B$=the flux density in the core
$B_m$=the maximum flux density at saturation Performing the integration gives:

$$E_R T_S = N_G A_C B_m \qquad (2)$$

$$T_S = \frac{N_G A_C B_m}{E_R} \qquad (3)$$

Figure 4:
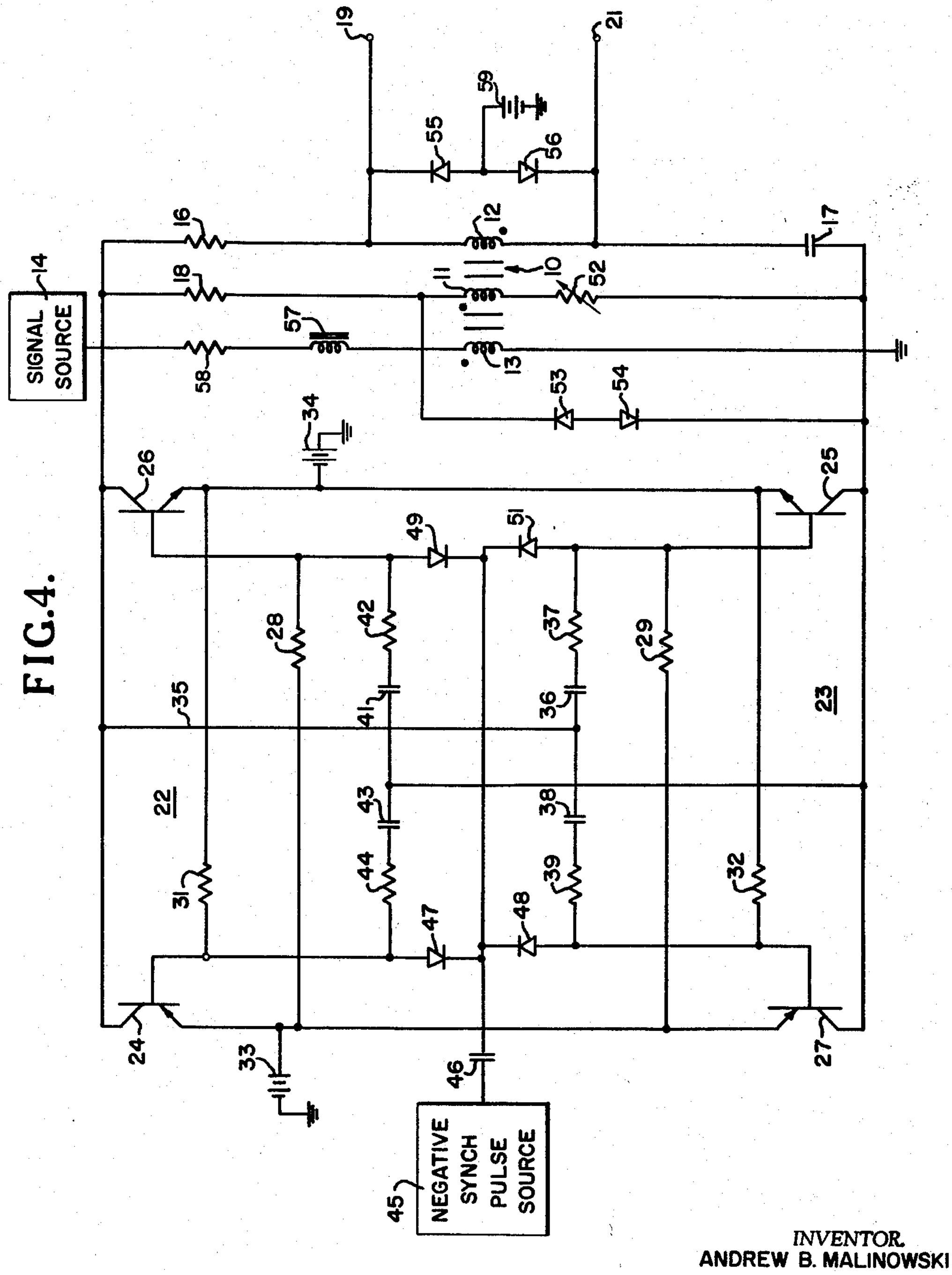
FIG. 4 is a circuit diagram of a modification of the invention which employs a transistor square wave oscillator.

The constant voltage, $E_R$, may be established by two series diodes placed back to back across the gate winding as shown in connection with FIG. 4. From these equations relating to the no-signal condition of operation of the modulator in which $B_m$ corresponds to the flux density at point B (or point E) on the hysteresis curve of FIG. 2 and zero relates to the flux density at the starting point of each cycle as represented by point A (or point D), it may be seen that the time, $T_S$, required to shift the core from its starting point of saturation is proportional to the difference in flux density between the starting point and the saturated condition. Thus, if the starting point is shifted from the zero flux density point established by the bias winding to a point such as G, as illustrated, closer to the flux density of saturation then the time required to shift the flux from the new starting point to saturation will be shorter than in the original case. The shifting of the starting point is accomplished by a signal on the signal winding 13. It may be seen that even a very small amount of signal (as illustrated by $\Delta H$ in FIG. 2) will result in greatly changing the flux density of the starting point.

It is to be noted that a voltage will only appear on the output terminals 19 and 21 across the gate winding 12 during the time that the flux in the core is being shifted from an unsaturated to a saturated state. After saturation has been attained, the inductive reactance of the winding is lowered which allows more magnetizing current to flow, which increases the flux density in the core, thereby increasing the degree of saturation; this regenerative process takes place very rapidly (about 40 microseconds) and moves the core along to a point of greater saturation, such as point B. The current through the gate 12, which is limited by the series resistance 16, provides a peak magnetizing force a hundred times greater than that of the coercive force of the magnetic material. This allows the core to be driven rapidly into saturation, resulting in a sharp cut-off of the output voltage. After saturation has been reached the magnetizing current is absorbed by the series capacitor 17 according to the RC time constant of the circuit, which should be approximately five milliseconds. The resetting of the core along the path BCD requires much time (in the order of hundreds of milliseconds) because of the high sensitivity applications. This time is very much dependent on the characteristics of the core 10 and of the circuit parameters. Because of the relatively long time required for this resetting operation only a very slight, almost negligible voltage is induced in the gate winding 12 by this change of flux in the core.

Figure 3:
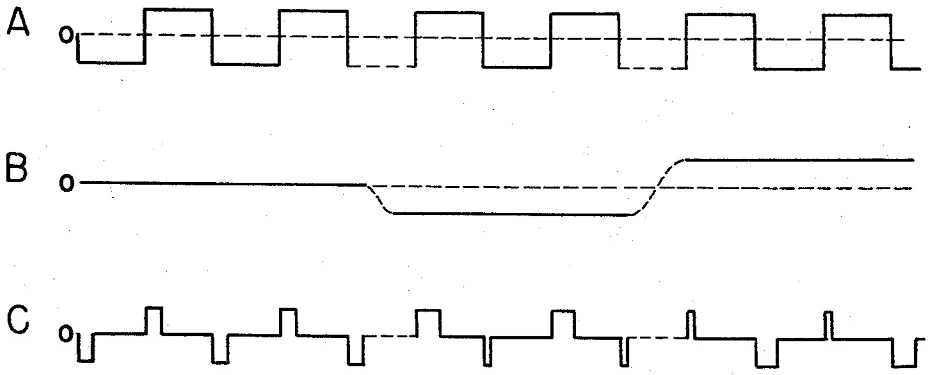
FIG. 3 is a graphical illustration of the operation of the pulse width modulator shown in FIG. 1.

Thus in operation, a low level signal from signal source 14 will decrease the time of the output voltage pulse across the gate winding 12 during the application of a pulse of one polarity from the square wave oscillator 15 (as illustrated by point G) and increase the time for a pulse of the other polarity (as illustrated by point 1). The results of the application of particular input signals to the modulator are illustrated by FIG. 3 in which wave shape A illustrates the alternating square waves pulses applied by the square wave oscillator 15, wave shape B illustrates zero, positive, and negative input signals from the source 14 and wave shape C illustrates the voltage output on terminals 19 and 21 for each of the three input signals. During the no signal condition, the positive and negative output signals are of the same pulse width and integration of the output voltage pulses over one full cycle of operation will be equal to zero or, in other words, the output voltage contains no D.C. component for steady state. During the presence of a negative input signal, the positive output pulses are of greater pulse width than the negative output pulses and vice versa for the condition of the positive input signal condition of operation. Thus, integration of the output voltage pulses over one full cycle during the presence of a signal will yield a D.C. component proportional to the amplitude of the signal and of opposite polarity therewith. The signal current produces a D.C. component in the output voltage which is of opposite polarity to the input signal; therefore, if the input signal was introduced at the gate winding 12 and if the signal circuit had sufficiently low resistance, the D. C. component of the output voltage would cause a current to flow which would be opposite to that of the signal current. This opposing or feedback current would reduce the level of the average voltage component, and in the extreme case the average voltage component would be reduced to zero if the signal current resistance were very low. For this reason the signal must be introduced by its own separate winding.

FIG. 4 illustrates an embodiment of the invention which employs the basic concepts of the magnetic modulator driven by a transistor square wave oscillator such as to achieve great accuracy of modulation at very low power requirements. The square wave oscillator comprises a pair of identical flip-flops 22 and 23; each of the flip-flops is composed of a PNP transistor (27 or 24) and an NPN transistor (25 or 26). The collectors of the two transistors in each flip-flop are connected together. Both of the PNP transistors receive their emitter supply voltage from a positive D.C. source 33; and both NPN transistors receive their emitter supply voltage from a negative D.C. source 34. The D.C. source 33 is also applied through the resistors 28 and 29 to act as the bias for the bases of the respected NPN transistors 26 and 25; likewise the negative D.C. source 34 is applied through resistors 31 and 32 to the bases of the PNP transistors 24 and 27 respectively. The output from the collectors of the transistors 24 and 26 of the flip-flop 22 are applied through lead 35, through the delay network composed of capacitor 36 and resistor 37 to the base of the transistor 25 of the other flip-flop 23, and through the delay network composed of the capacitor 38 and resistance 39 to the base of the transistor 27 of the other flip-flop 23. A similar cross connection of the output of the flip-flop 23 is applied through equal RC circuits made up of capacitor 41 and resistance 42 to the base of transistor 26 and capacitor 43 and resistor 44 to the base of transistor 24. Thus, the normally bi-stable circuit has been modified to provide astable operation with feedback networks between the two flip-flops having relatively long RC charging time constants. Thus for one half of the cycle the PNP transistor 24 of the flip-flop 22 is conducting along with the NPN transistor 25 of the flip-flop 23; these signals from each flip-flop are transmitted through the respective RC circuits to the other flip-flop to change the state thereof after a time determined by the RC charging time constants. After a time the transistors 24 and 25 are cut off and the transistors 26 and 27 are cut on thus reversing the polarity of the signals. The time length of each half cycle of the output voltage can vary according to the degree to which certain components are matched. To insure equality of each half cycle, a synchronizing oscillator 45 provides negative synchronizing pulses through the isolating capacitor 46 to the base of each transistor through the respective diodes 47, 48, 49 and 51. The synchronizing oscillator 45 has a frequency of more than twice the free running frequency of the square wave oscillator and thus triggers the square wave oscillator each half cycle to maintain synchronization. This oscillator exhibits high efficiency and very short switching times of less than one microsecond.

The transistor square wave oscillator is connected to the magnetic modulator similar to that shown in FIG. 1, wherein similar components bear similar reference numerals. The alternating pulses from the transistor square wave oscillator are supplied to the bias winding 11 and the gate winding 12. An additional variable resistor 52 is provided in series with the fixed resistance 18 to allow for a fine adjustment of the resistance value in this branch thus allowing the bias current to be accurately set to the proper value. In addition a pair of diodes 53 and 54 connected back to back form a voltage regulating circuit across the bias winding 11 and the variable resistance 52 such that the voltage applied from the transistor square wave oscillator to the winding 11 will be of uniform amplitude. Another set of diodes 55 and 56 connected back to back across the gate winding 12 and used with the D.C. voltage source 59 therefore insures that the output voltage across the gate winding 12 of the magnetic modulator during the switching of the core 10 is a constant value.

The single magnetic core modulator avoids the problem of matching saturable reactors. However, the major objections to using a single core is the presence of large voltages in the signal winding which would normally be cancelled in the case of a two core modulation system. These large voltages are prevented from developing excessive currents in the signal winding 13 by introducing an isolating choke coil 57 in the signal circuit along with a resistance 58. This isolating choke will cause losses in response depending on the L/R ratio of the input circuit so must not be made too large.

It will be understood that various changes in the details, materials, and arrangements or parts which have been herein described and illustrated in order to explain the nature of the invention, may be made by those skilled in the art within the principle and scope of the invention as expressed in the appended claims.

What is claimed as new and desired to be secured by Letters Patent of the United States is:

1. A magnetic modulator for low frequency signals at low signal levels comprising a magnetic core having a substantially rectangular hysteresis loop with two stable states of saturation, a gate winding wound in one direction on said core to drive said core to saturation, a bias winding wound in the opposite direction on said core to bias said core to a point intermediate said two stable states, a signal winding on said core, a signal source producing said low frequency signal connected to said signal winding, a generator of square wave pulses of alternating polarity connected to said bias and said gate windings, a capacitor connected in series between said gate winding and said generator, said core being driven into a first state of saturation by a pulse from said generator passing through said gate winding until said capacitor is fully charged, and said core being returned to a state of magnetization determined by the combined action of said bias winding and said signal winding until a pulse of the opposite polarity is produced by said generator, whereby square wave voltage pulses across said gate winding are modulated in accordance with said low frequency signals.

2. The modulator of claim 1 further comprising a current limiting resistor connected in series with said capacitor and said gate winding.

3. The modulator of claim 1 further comprising a choke coil in series with said signal winding.

4. The modulator of claim 1 further comprising a bias resistor in series with said bias winding to limit the current through bias winding to the amount necessary to return said core from one stable state of saturation to an unsaturated state.

5. The magnetic modulator of claim 1 in which said generator comprises a pair of complementary flip-flops, each of said flip-flops including a pair of opposite type transistors having the emitter supply thereof connected to the base of the opposite transistor through a resistor, and the collectors thereof connected together, four resistance-capacitance charging circuits, each of said charging circuits being separately connected to a respective base of each of said transistors, and both of said circuits in each of said flip-flops being connected to the collectors of the other flip-flop, whereby a square wave signal is produced between the collectors of each of said flip-flops.

6. A low frequency, low level signal modulator comprising a source of alternating pulses to be modulated by said signal, a magnetic core with two stable states of saturation, signal means for applying a flux proportion to said low frequency, low level signal to said core, gate means connected to said source for driving said core to saturation in alternating ones of two stable states during the initial time portion of each of said alternating pulses, bias means for returning said core to a magnetic state intermediate said two stable states during the remainder of each of said alternating pulses, whereby said alternating pulses are modulated by said low frequency, low level signal.

7. The modulator of claim 6 wherein said gate means comprises a gate winding wound on said core and a capacitor in series relationship, and wherein the voltage appearing across said gate winding consists of said modulated alternating pulses.

8. The modulator of claim 6 in which said alternating pulses are square wave pulses.

9. A square wave generator comprising a pair of complementary flip-flops, each of said flip-flops including a pair of opposite type transistors having the emitter supply thereof connected to the base of the opposite transistor through a resistor, and the collectors thereof connected together, four resistance-capacitance charging circuits, each of said circuits being separably connected to a respective base of each of said transistors, and both of said circuits in each of said flip-flops being connected to the collectors of the other flip-flop, whereby a square wave signal is produced between the collectors of each of said flip-flops.

References Cited by the Examiner

UNITED STATES PATENTS

| | | | |
|---|---|---|---|
| 2,780,782 | 2/57 | Bright | 332—9 |
| 2,814,738 | 11/57 | Freeman et al. | 332—12 |
| 2,970,301 | 1/61 | Rochelle | 332—12 |
| 2,994,840 | 8/61 | Dorsman | 332—12 |
| 3,136,960 | 6/64 | Ausfresser | 332—12 |

ROY LAKE, *Primary Examiner.*

ROBERT H. ROSE, ALFRED L. BRODY, *Examiners.*